United States Patent
Chessher et al.

(10) Patent No.: US 10,020,906 B2
(45) Date of Patent: *Jul. 10, 2018

(54) ADAPTIVE MULTI-CLIENT SINGLE HOST TDMA COMMUNICATIONS

(71) Applicant: ECHOSTAR TECHNOLOGIES L.L.C., Englewood, CO (US)

(72) Inventors: Brett Chessher, Littleton, CO (US); Scott Fillingim, Castle Rock, CO (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,203

(22) Filed: Jun. 13, 2016

(65) Prior Publication Data

US 2016/0285577 A1   Sep. 29, 2016

Related U.S. Application Data

(63) Continuation of application No. 13/916,800, filed on Jun. 13, 2013, now Pat. No. 9,385,828.

(51) Int. Cl.
*H04J 3/16* (2006.01)
*H04B 7/26* (2006.01)
(Continued)

(52) U.S. Cl.
CPC .......... *H04J 3/1694* (2013.01); *H04B 7/2656* (2013.01); *H04J 3/1682* (2013.01);
(Continued)

(58) Field of Classification Search
CPC ... H04B 7/2646; H04B 7/2656; H04J 3/1682; H04J 3/1688; H04J 3/1694;
(Continued)

(56) References Cited

U.S. PATENT DOCUMENTS

| 4,340,961 A | 7/1982 | Capel et al. |
| 4,940,974 A | 7/1990 | Sojka |

(Continued)

FOREIGN PATENT DOCUMENTS

| WO | 1994005131 A1 | 3/1994 |
| WO | 1998054859 A1 | 12/1998 |
| WO | 2004032026 A1 | 4/2004 |

OTHER PUBLICATIONS

European Patent Office, International Search Report and Written Opinion, dated Sep. 29, 2014 for International Application No. PCT/US2014/042072.

*Primary Examiner* — Khoa Huynh
(74) *Attorney, Agent, or Firm* — Lorenz & Kopf LLP

(57) ABSTRACT

TDMA communications between a host device and a number of clients on a communications channel are dynamically adapted to allocate or de-allocate time slots in response to changes in the number of active clients. The system initially operates in a startup mode in which the host device transmits a startup message on the communications channel and assigns a timeslot in a TDMA cycle in response to connection requests received from each of the requesting clients. After exiting the startup mode, the system operates in a normal mode in which the host device initiates the TDMA cycle by transmitting a polling message on the communications channel that indicates a number of timeslots occurring within that particular TDMA cycle. The host changes the number of timeslots indicated in the polling message to responsively adapt duration of the TDMA cycle as the number of clients communicating via the communications channel changes.

18 Claims, 6 Drawing Sheets

(51) Int. Cl.
*H04W 74/06* (2009.01)
*H04W 72/04* (2009.01)
*H04W 72/12* (2009.01)

(52) U.S. Cl.
CPC ....... *H04W 72/0446* (2013.01); *H04W 74/06* (2013.01); *H04W 72/1278* (2013.01)

(58) Field of Classification Search
CPC ......... H04W 72/1278; H04W 72/1284; H04W 72/1289; H04W 72/1294; H04W 72/14; H04W 74/04; H04W 74/06; H04W 72/0446
See application file for complete search history.

(56) References Cited

U.S. PATENT DOCUMENTS

| | | | |
|---|---|---|---|
| 5,297,144 A | | 3/1994 | Gilbert et al. |
| 5,606,322 A | * | 2/1997 | Allen ........................ G06F 7/58 340/5.74 |
| 2001/0050910 A1 | * | 12/2001 | Oh ...................... H04W 74/006 370/336 |
| 2002/0105970 A1 | * | 8/2002 | Shvodian .............. H04W 16/14 370/468 |

* cited by examiner

ADAPTIVE MULTI-CLIENT SINGLE HOST TDMA COMMUNICATIONS

TECHNICAL FIELD

The present disclosure generally relates to data communications, and more particularly to systems, devices and techniques for adaptive data communications exchanged between a single host and multiple clients.

BACKGROUND

Many different data communications techniques have been developed and widely deployed across many different kinds of wired and wireless media. Telephone and data networks, for example, make use of many different types of data communications protocols and techniques. As more complex computing, communication and entertainment systems become increasingly reliant upon interactions between multiple devices, the need for effective data communications continues to increase.

One data communications technique that has seen widespread adoption is time division multiple access (TDMA) encoding. TDMA is a channel access technique that allows several transmitters to share a common wired or wireless channel by assigning each transmitter its own time slot for using the shared channel. TDMA has been widely implemented in mobile telephony, wired and wireless networks, home and industrial controls, and in many other settings.

Conventional TDMA is limited, however, in that it can be relatively inflexible or inefficient for some applications. Efficiently allocating TDMA bandwidth can be relatively difficult, for example, when the number of transmitters sharing a particular channel changes frequently or is otherwise difficult to predict. This can lead to inefficient allocation of channel bandwidth and/or other challenges in effectively supporting all of the desired devices. Various attempts at "dynamic" TDMA have emphasized allocation according to bandwidth consumption, which can be useful in some settings but overly complex in others.

It is therefore desirable to create systems, device and methods that can adapt as transmitters enter or leave a communication system while still efficiently and effectively transmitting data on a shared communications medium. These and other desirable features and characteristics will become apparent from the subsequent detailed description and the appended claims, taken in conjunction with the accompanying drawings and this background section.

BRIEF SUMMARY

According to various embodiments, TDMA communications between a host device and a number of clients on a communications channel are dynamically adapted to allocate or de-allocate TDMA time slots in response to changes in the number of active clients. The system initially operates in a startup mode in which the host device transmits a startup message on the communications channel and assigns a timeslot in a TDMA cycle in response to connection requests received from each of the requesting clients. After exiting the startup mode, the system operates in a normal mode in which the host device initiates the TDMA cycle by transmitting a polling message on the communications channel that indicates a number of timeslots occurring within that particular TDMA cycle. The host changes the number of timeslots indicated in the polling message to adapt the duration of the TDMA cycle in real time (or near real time) in response to changes in the number of clients communicating via the shared channel.

Other embodiments provide a host device that communicates with a plurality of clients via a communications channel, the host device comprising an interface to the communication channel and a processor. The processor is configured to initially operate in a startup mode in which the host device transmits a startup message on the communications channel and, in response to connection requests received from at least some of the plurality of clients during the startup mode, assigns a timeslot in a TDMA cycle to each requesting client. After exiting the startup mode, the processor operates in a normal mode in which the host device initiates the TDMA cycle by transmitting a polling message on the communications channel, wherein the polling message indicates a number of timeslots occurring within the TDMA cycle. The processor changes the number of timeslots indicated in the polling message from TDMA cycle to TDMA cycle to thereby adapt each TDMA cycle as the number of clients communicating via the communications channel changes.

Still other embodiments relate to methods executable by a client device that communicates with a host via a communications channel. The method comprises obtaining an assigned timeslot in a TDMA cycle from the host via the communications channel; receiving a polling message indicating the beginning of the TDMA cycle from the host via the communications channel, wherein the polling message indicates timing information about the TDMA cycle including a number of timeslots occurring within the TDMA cycle, and wherein the number of timeslots dynamically varies from TDMA cycle to TDMA cycle depending upon a number of client devices communicating on the communication channel; and transmitting a message to the host via the communications channel during the assigned timeslot of the TDMA cycle, wherein the assigned timeslot is determined based upon the number of timeslots indicated in the polling message for the TDMA cycle.

Still other embodiments relate to client devices that communicate with a host via a communications channel. The client device suitably comprises an interface to the communications channel and a processor. The processor is configured to obtain an assigned timeslot in a TDMA cycle from the host via the communications channel, to receive a polling message indicating the beginning of the TDMA cycle from the host via the communications channel, wherein the polling message indicates timing information about the TDMA cycle including a number of timeslots occurring within the TDMA cycle, and wherein the number of timeslots dynamically varies from TDMA cycle to TDMA cycle depending upon a number of client devices communicating on the communication channel, and wherein the processor is further configured to transmit a message to the host via the communications channel during the assigned timeslot of the TDMA cycle, wherein the assigned timeslot is determined based upon the number of timeslots indicated in the polling message for the TDMA cycle.

Still other embodiments relate to communications systems or techniques in which any number of clients communicate with a host via a communications channel using adaptive/dynamic TDMA timing. Polling messages transmitted by the host indicate the beginnings of TDMA cycles and provide timing information (e.g., the number of timeslots in the cycle and/or the durations of the timeslots) that can change from TDMA cycle to TDMA cycle.

These and other embodiments, aspects and features are described in detail below, and may be augmented or modified in many different ways.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an example of a communications system;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, an adaptive time division multiple access (TDMA) system allows robust communication between a host and any number of clients over a shared communications channel. This system allows for clients to be added and/or removed from the communications system in real time, thereby adapting the communications scheme as needed for improved time efficiency in a changing environment.

Although the following discussion uses a home-type television distribution system as an illustrative example, equivalent embodiments could be deployed in any communications setting in which a single host communicates with a variable number of clients over a shared communications channel. Such settings could include, without limitation: wireless or wired telephony systems; sensing or control systems; home or commercial entertainment systems; aerospace, automotive or other vehicle controls; and/or any other communications systems as desired.

Figure 1:
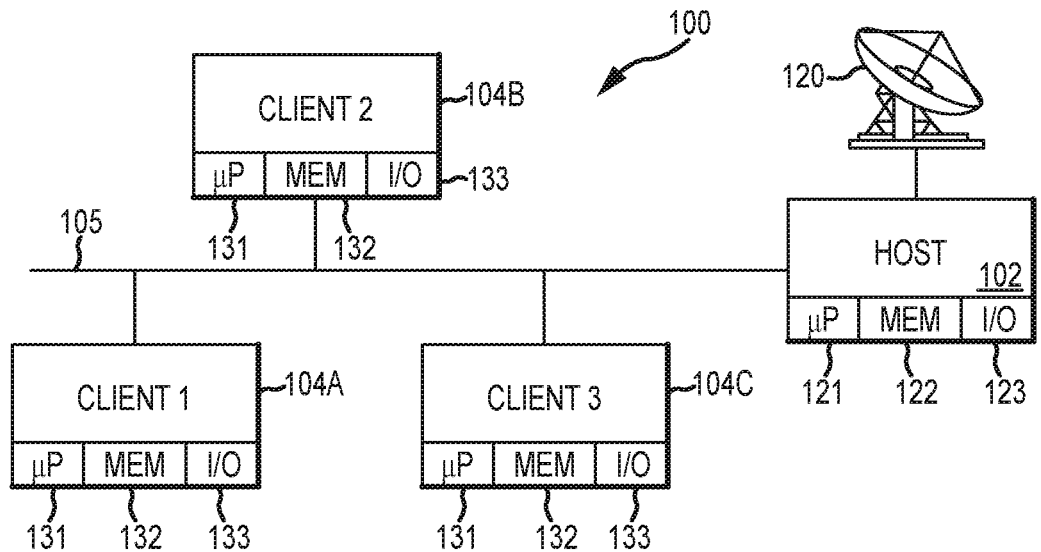

Turning now to the drawing figures and with initial reference to FIG. 1, an exemplary communications system 100 suitably includes a host device 102 that communicates with any number of client devices 104A-C via a shared communications channel 105. Typically, host 102 assigns TDMA timeslots to each of the clients 104A-C based upon the various startup and operating procedures set forth below. During normal communications, each TDMA communications cycle is initiated by a polling message 112 that emanates from host 102. Each polling message 112 identifies the start of a new communication cycle, and may also specify timing information about the particular cycle, such as the number of timeslots that will make up the current cycle, the timeslot duration, any specific timeslots from the previous cycle that are de-allocated, any timeslots that have potential to be de-allocated in subsequent timeslots if responses are not received, and/or other information as desired. If a client 104 has a message 114 to send to the host 102, that message is transmitted during the client's assigned timeslot. Because the timing parameters for each cycle are defined by the polling message 112 set at the outset of the cycle, the parameters can be modified to adapt the TDMA cycle essentially in real time. As new clients 104 join system 100, for example, additional timeslots can be dynamically added into the TDMA scheme without disrupting the current configuration. Similarly, timeslot durations could be lengthened or shortened in real time to accommodate different types of data, or for any other purpose.

Host device 102 and client devices 104A-C are any devices capable of communicating using a shared communications channel 105. Many different types of host and client devices can be readily implemented using conventional set top boxes, network controllers, mobile computing devices, home electronics, computer systems and/or any other electronic or computing components as desired.

To that end, host 102 will typically include any sort of conventional computing hardware, such as any sort of conventional control or processing circuitry 121 that operates in conjunction with digital memory 122 and any sort of conventional input/output interfaces 123 as appropriate. In various embodiments, interfaces 123 includes a modem or other hardware interface to a wired or wireless communication channel 105 as desired. Typically, the various functions of host 102 are implemented with a processor 111 executing software or firmware code that is stored in memory 112 and/or in any sort of non-transitory electronic, optical or magnetic mass storage. Host 102 may include other conventional hardware capabilities as are commonly found on electronic and computing devices, as desired.

Each client device 104A-C similarly implements the various functions described herein using any conventional computing hardware commonly found in media players, set top boxes, computer systems, sensing or control devices and/or any other types of clients 104A-C as desired. In a typical embodiment, each client 104 performs the various functions described herein using a processor 131 executing software or firmware code that is stored in a digital memory 132 and/or in any sort of non-transitory electronic, optical or magnetic mass storage. Each client 104A-C will also contain appropriate input/output interfaces 133 including a hardware interface to a wired or wireless communications channel 105.

In the example illustrated in FIG. 1, host device 102 is illustrated as a control device that is associated with a direct broadcast satellite (DBS) television system implemented within a home, business or other structure. Such a control device may be used to adjust a low noise block downconverter (LNB) or other component of a DBS outdoor unit (ODU) 120, as desired, to obtain desired television programming that is provided to a set top box, media player or other client device 104A-C. In such embodiments, communications channel 105 could be used to transmit command and control messages 114 that instruct the host 102 to receive different programs, to adapt a media stream, or to take other actions as directed by the client 104A-C. Again, equivalent concepts could be applied in any number of other communications settings and applications as desired.

Communications channel 105 is any medium capable of relaying messages between host 102 and any number of clients 104A-C on a time-shared basis. In the DBS television system illustrated in FIG. 1, communications channel 105 may be a conventional coaxial cable that relays messages 112, 114 modulated with frequency shift keying (FSK) or the like. Other embodiments could use other physical transmission media (such as Ethernet or other LAN wiring) or any wireless channel 105 as desired. Television programming or other data could be transmitted on the same physical medium as channel 105, although such content will typically be modulated at a different frequency band than the control signals passed on channel 105.

Figure 2:
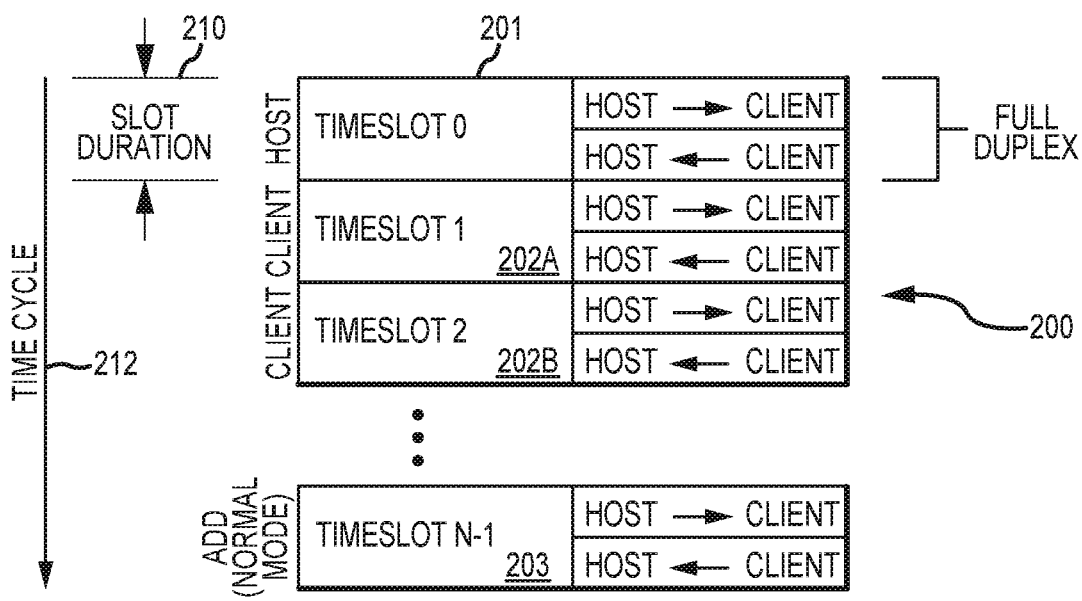
FIG. 2 is a block diagram of an example of a TDMA cycle.

As in conventional TDMA, the various entities 102, 104A-C communicating on channel 105 are each assigned to a unique timeslot. In the example of FIG. 2, each TDMA cycle 200 includes a timeslot 201 during which the host 102 provides a polling message 112 on channel 105. The polling message 112 indicates the start of a new TDMA cycle 200, thereby providing a per-cycle time synchronization reference for each of the clients 104A-C in system 100. Polling message 112 suitably indicates whether the system 100 is operating in a "startup" mode or a "normal" mode, as described more fully below. Polling message 112 may also indicate the current number of timeslots 201-203 that are in use, and/or the duration 210 of each timeslot. As the number of timeslots and/or the duration 210 of each slot changes, each client 104A-C that receives the polling message 112 can react to the changes immediately using the information provided by the polling message 112 for that TDMA cycle 200, thereby allowing for highly adaptive messaging scheme.

In the example of FIG. 2, data communications are full-duplex, meaning that the host 102 and devices 104A-C can transmit and receive data at the same time. Full duplex communications can be implemented on channel 105 in any manner using, for example, conventional FSK techniques or the like (e.g., by modulating messages and replies with separate carrier frequencies). In various embodiments, the timeslots 201-203 shown in FIG. 2 represent times in which the assigned device is able to transmit messages on channel 105. Acknowledgments or other responses from the receiving device may be transmitted on the following timeslot, or even outside of the TDMA cycle if the message is sent during the final timeslot of the cycle. If a client 104A transmits a message to host 102 during timeslot 202, for example, then host 102 may respond back to client 104A during the next subsequent timeslot, as desired. Transmissions made during the final timeslot 203 may be acknowledged with in the time immediately following the timeslot 203, even though this time may be considered to be outside of the traditional TDMA cycle 212. Other embodiments may operate in half duplex or other modes, if desired, by assigning separate timeslots 201-203 for transmitting messages and replies on channel 105, thereby effectively subdividing the assigned timeslots for each device. Still other embodiments may batch responses from host 102 for transmission during a separate timeslot, or may operate in any other manner.

During normal mode operation, then, the host 102 broadcasts the polling message 112 on channel 105 during the first timeslot 201, thereby marking the beginning of the TDMA cycle 200. Polling message 112 will typically describe the number of timeslots 201-203 in the cycle 200, and may also describe the duration 210 of each slot and/or the duration of the entire cycle 212 as desired. The duration 210 may be initially set to any appropriate value to accommodate the messages 112, 114 that are being sent, along with an appropriate time buffer to account for delays inherent in processing, communicating, and other factors. In an exemplary embodiment, timeslots 201-203 may be initially configured to have durations 210 on the order of 5-15 ms or so, although other embodiments could use any other durations 210 suitable for the particular data being transmitted. Various embodiments allow the duration 210 to change between TDMA cycles by changing the duration announced in the polling message 112 so that clients 104 can adapt accordingly. Other embodiments may not need real-time adjustment of timeslot durations 210; such embodiments could simply use a fixed duration 210 while still adjusting the number of timeslots 202 as described herein.

Each client 104A-C transmits messages 114 to the host 102 during its pre-assigned timeslot 202. Although FIG. 2 only shows one timeslot 202 that would be assigned to a client 104, in practice any number of timeslots 202 could be assigned so that any number of clients 104A-C are able to communicate during TDMA cycle 200. Each client 104 is appropriately configured to listen for the polling message 112, to determine the appropriate timeslot 202 for communicating on channel 105, and to transmit messages 114 to host 102 only during that pre-assigned slot. Clients 104 will not communicate during the initial timeslot 201, which is reserved for the host 102 to transmit the polling message 112 in this example.

The final timeslot 203 in TDMA cycle 200 may be reserved in the normal mode to allow new clients 104 to communicate with host 102, as described more fully below. As new clients 104 join, additional timeslots 202 are assigned and the duration 212 of cycle 200 is correspondingly increased as needed. As clients 104 time out (e.g., fail to respond to the host 102 during an appropriate consecutive number of cycles) or otherwise leave system 100, the timeslots 202 previously assigned to those clients 104 can be reallocated to other clients 104 so that the duration 212 of cycle 200 decreases. Polling message 112, for example, could specify any de-allocated timeslots 202 to allow active clients to advance their timeslots (e.g., by an integer number) if their current timeslot is scheduled to occur after a de-allocated timeslot 202. The duration 212 of TDMA cycle is therefore adjusted as needed to provide a timeslot 202 for each client 104 that is active in system 100, with only one additional timeslot 203 to accommodate new clients 104. By dynamically providing the parameters of each cycle 200 with the polling message 112 that initiates the cycle, bandwidth on channel 105 is conserved while improving the responsiveness of system 100.

Figure 3:
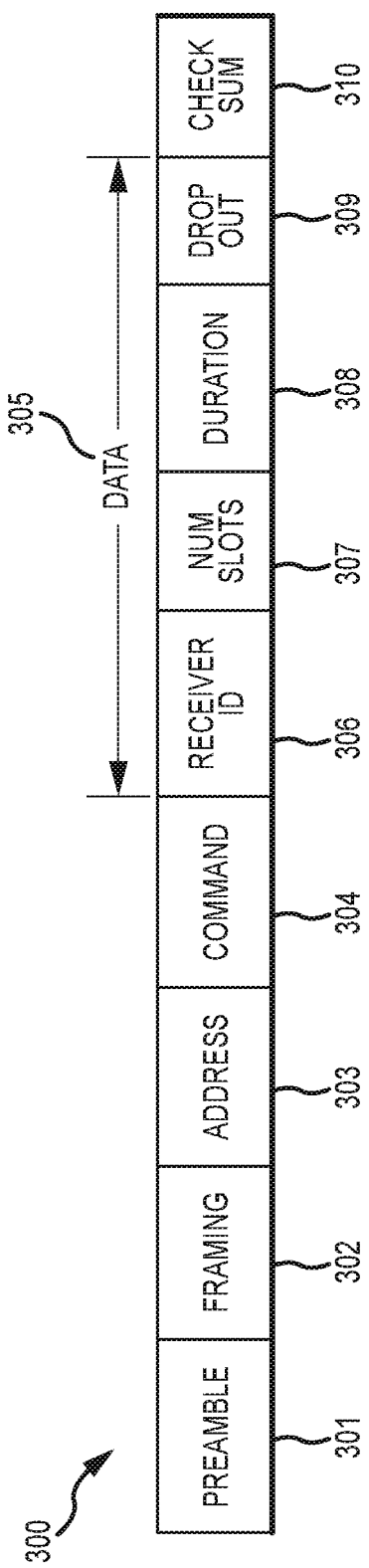
FIG. 3 is a diagram of an example of a message that could be transmitted within an adaptive TDMA system.

Messages 112, 114 sent within system 100 may be formatted in any manner. FIG. 3 shows an exemplary format in which each message 300 includes various data fields 301-310 for transporting data bits that encode different types of information. In the example of FIG. 3, an FSK or similar packet is formatted to include a suitable preamble 301, framing bits 302, addressing 303 and/or the like. Preamble 301 may include, for example, a known bit sequence for synchronization and timing. Framing bits 302 may be used to identify the type of message 300 being sent (e.g., initial transmission, retransmission, reply, error, etc.), or for any other purpose.

Single or multi-byte addressing 303 may be implemented in some implementations, although addressing in other embodiments could be deduced from the timing of the message. In systems 100 wherein all messages 114 are sent from a client 104 to a host 102, for example, the message sender and recipient will be inherent from the timeslot 202 in which the message 114 is being sent, so additional addressing data 303 may not be needed.

Commands 304 may be specified in any manner according to the particular implementation. In a system 100 that is used to provide instructions from a STB or media player client 104 to an ODU host 102, for example, the various commands 304 may relate to such features as changing frequency bands received by the ODU, providing instructions to read or write data, obtaining status information and/or the like.

Command data 304 could also be used to indicate the type of message 300 being sent. Different bit values stored in command data 304 could be used to distinguish between TDMA startup mode and normal TDMA mode messages, for example, or to instruct clients 104A-C to de-allocate their TDMA timeslots 202 and revert to startup mode, as described more fully below. Command data 304 could also be used by a client 104 to request a timeslot 202, to de-allocate an assigned timeslot 202, or for any other purpose. Many alternate and/or additional commands 304 could be provided in any number of other embodiments.

Data fields 305 may contain any sort of data payload as desired. In many embodiments, data fields 305 provide several bytes of data related to a command 304 contained within message 300. If message 300 is a request from a client 104 to obtain a TDMA timeslot 202, for example, data field 305 may contain a receiver identifier 306 that uniquely identifies the particular client 104 making the request. This identifier 306 could also be used in a subsequent request 300 to de-allocate a timeslot 202, or for any other purpose.

Data fields 305 may contain other information as desired. A startup mode polling message, for example, might be identified by a command 304 that is augmented with a data value 307 specifying the number of timeslots 201-203, a value 308 specifying a time slot duration 210, or the like. A normal TDMA mode polling message may similarly include data fields specifying the number of timeslots (field 307) and the time slot duration (field 308), along with information about slot numbers that are de-allocated or about to expire (field 309). If three clients 104A-C are operating with consecutively-numbered timeslots 1, 2 and 3, for example, and client 104B requests de-allocation of its slot 2, then host 102 may wish to broadcast that slot 2 has been de-allocated as part of data 305 contained within polling message 112. As client 104C recognizes that slot number 2 is no longer allocated, it will automatically switch its assigned slot from slot 3 to slot 2 to adapt to the decreased time cycle 212 in TDMA cycle 200.

Additional or alternate data fields 305 could be used for any other purposes. If a client 104 has not transmitted any messages to host 102 in some time, for example, then host 102 may wish to query whether the client 104 is still active. By indicating the client's slot number in a dropout field 309 (or in a separate timeout field), the client can be prodded to send a message in the current or upcoming TDMA cycle 200, thereby indicating that the client 104 is still active. If the client 104 does not respond during an appropriate time period (e.g., one or more TDMA cycles), then the host 102 may unilaterally de-allocate the client's timeslot 202 using the techniques described herein.

Any number of alternate and/or additional data fields 301-310 may be provided in message 300. In the embodiment illustrated in FIG. 3, message 300 concludes with a checksum 310 that allows the recipient to verify the contents of the message 300. Checksum 310 may be computed using any sort of cyclic reduction code (CRC), digest algorithm or other appropriate technique as desired.

FIGS. 4-7 illustrate exemplary processes 400, 500, 600, 700 that could be executed by host 102 and/or clients 104 operating within system 100. The various functions shown in FIGS. 4-7 may be implemented using any sort of programmed logic, such as any sort of hardware, software, firmware or combination thereof. In various embodiments, the various functions shown in the figures are executed using conventional general-purpose hardware executing software instructions that are stored in electronic memory, magnetic storage, or in any other non-transitory storage media as desired.

Figure 4:
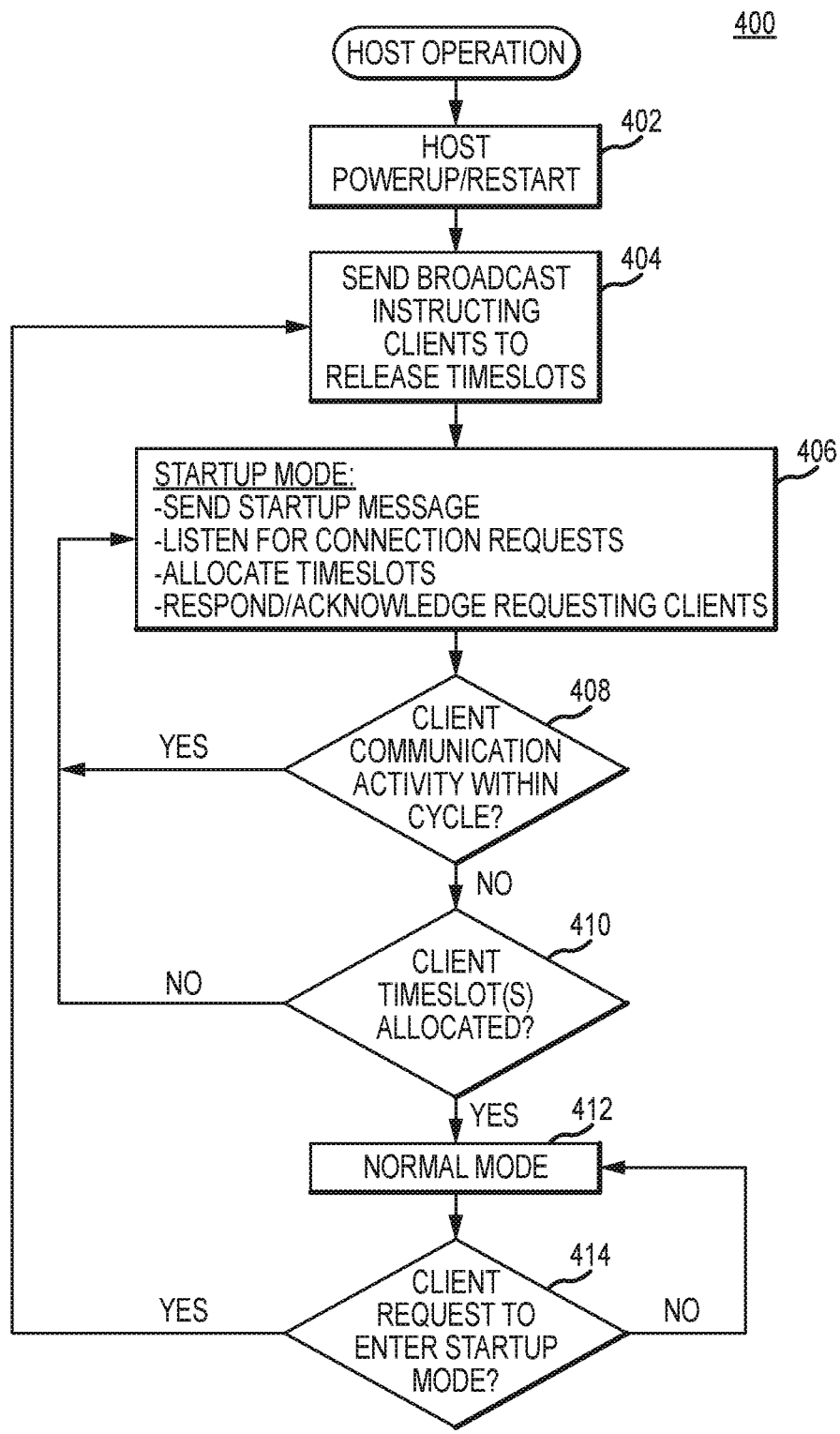
FIG. 4 is a flowchart showing an example of a process for operating a host device in an adaptive TDMA system.

FIG. 4, for example, shows an exemplary process 400 that could be carried out under the control of software or firmware logic stored in an appropriate non-transitory storage medium (e.g., memory 122 in FIG. 1) and executed by a microprocessor, microcontroller, digital signal processor or other processing circuitry 121 in host 102. Typically, when the host 102 comes online following a power up, reboot or the like (function 402), it will not have information about the clients 104 that are currently operating in system 100. Host 102 therefore broadcasts a message 300 on the communications channel 105 instructing any active clients 104A-C to de-allocate any timeslots 202 that may have been pre-assigned (function 404). This function 404 effectively places system 100 into a known state so that clients 104 can be discovered and timeslots 202 can be assigned.

In the startup mode (function 406), host 102 initially broadcasts a startup polling message 112 that initiates a startup TDMA cycle 200 and that describes the parameters of the cycle in terms of number of timeslots 202 and/or timeslot duration 210. In some embodiments, the number of startup timeslots may be initialized to be large relative to the number of expected clients 104. In many implementations, clients 104 will randomly select a startup timeslot in which to respond, as set forth in greater detail below. Selecting a number of startup timeslots that is an order of magnitude or so greater than the number of expected clients 104 can substantially reduce the likelihood of data collisions when clients 104 begin responding to the initial polling message 112.

Host 102 receives requests for timeslots 202 from one or more clients 104, as appropriate. When host 102 receives a request message from a client 104, an appropriate timeslot 202 is determined for the client and an acknowledgement message 300 is transmitted to the requesting client 104 specifying the assigned timeslot. Timeslots 202 may be assigned in any manner; various embodiments simply assign timeslots 202 in the order in which the request messages are received at the host 102. After receiving the assigned timeslot from the host 102, the client 104 will typically not respond to further startup messages to provide additional time within the startup TDMA cycle for other clients 104 to communicate with host 102 as needed to request a timeslot 202 or to perform other start-up related requests as appropriate.

Host 102 remains in startup mode until at least one client timeslot has been assigned (function 410), and until there has been no client communication activity for an entire TDMA cycle 200 (function 408). This ensures that all of the clients 104 that are active in system 100 have had an opportunity to request and obtain a timeslot 202 from the host 102.

The host 102 switches from the startup mode to the normal operating mode (function 412) by issuing a polling message 112 for a new TDMA cycle 200 that is based upon the number of active clients 104 operating within the system 100. Normal operating mode 412 of host 102 is described in increasing detail below with respect to FIG. 6. Host 102 typically remains in normal operating mode 412 until it is powered off or otherwise reset, thereby returning process 400 to function 402.

Various embodiments allow clients 104 to request a reconfiguration of the entire TDMA cycle 200 by re-entering startup mode. Some implementations allow a client 104 to transmit a message during the open timeslot 203 includes a request to re-enter startup mode (function 414). If such a request is received, then host 102 may respond by re-issuing a release message (function 404) and re-entering startup mode 406 as described above. A client may direct the host 102 to re-enter startup mode if it detects a substantial number of data collisions, or if it is having difficulty in obtaining a timeslot through normal mode operations, or for any other reason. If multiple new clients 104 come online simultaneously, for example, it may be more efficient to issue new timeslots 202 to each of the clients 104 in startup mode rather than to adapt the then-current timeslot scheme to accommodate the new participants.

Figure 5:
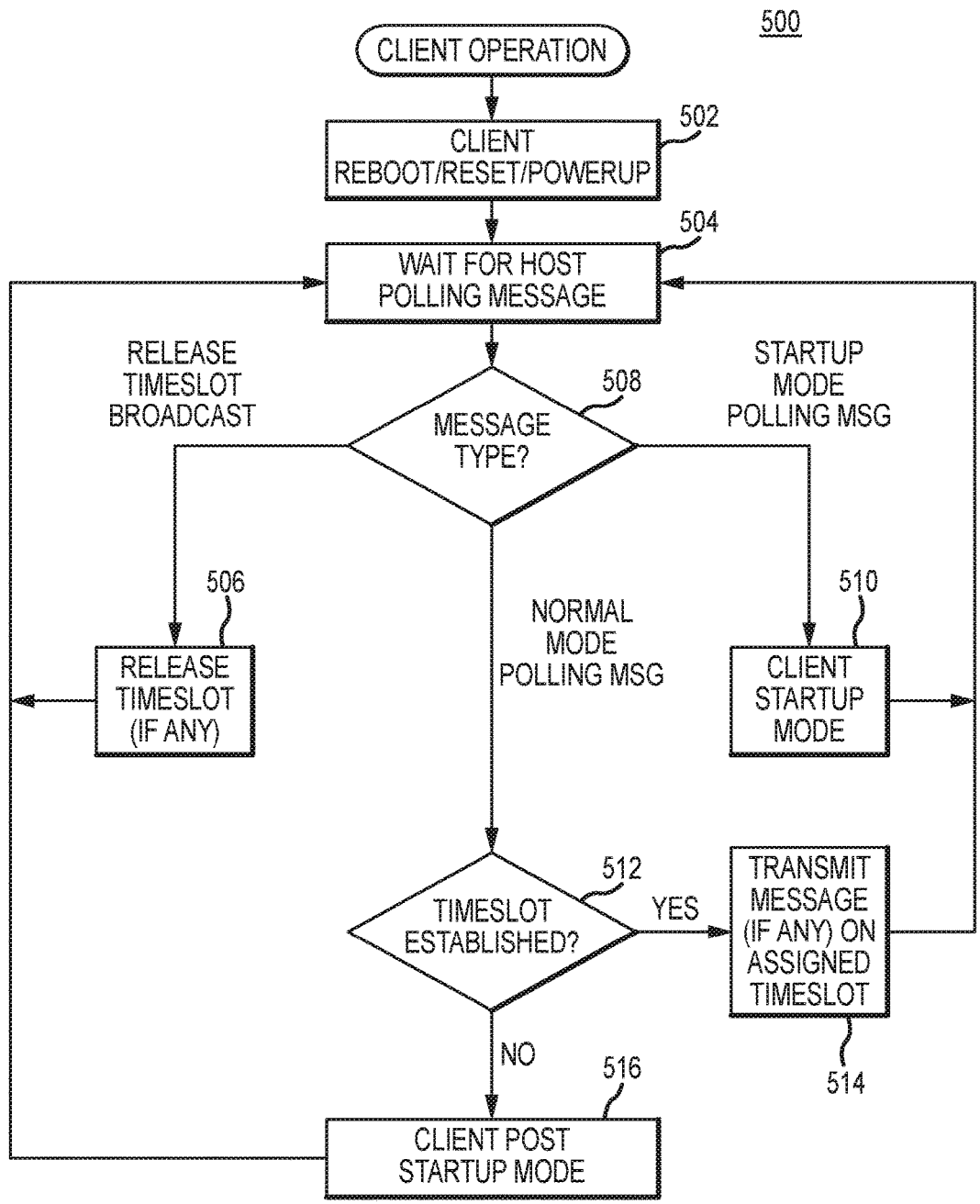
FIG. 5 is a flowchart showing an example of a process for operating a client device in an adaptive TDMA system.

FIG. 5 shows an exemplary process 500 executable by a client 104 operating within system 100. The various functions 502-516 shown in FIG. 5 may be executed by any sort of microprocessor, microcontroller, digital signal processor or other conventional processing circuitry within client 104, as desired. In an exemplary embodiment, the various functions shown in FIG. 4 may be implemented using software or firmware instructions that are stored in memory 132 or another non-transitory storage medium and that are executed under the control of a processor 131.

When client 104 is powered up or otherwise reset 502, the client 104 waits for a polling message 112 to be transmitted on channel 105 (function 504). Since the polling messages mark the beginnings of new TDMA cycles 200 and define the various timing parameters for communicating within the particular TDMA cycle 200, client 104 appropriately remains silent on channel 105 until the polling message 112 from host 102 is received. When a message 300 is received from host 102 on channel 105, then client 104 takes appropriate action (function 508) depending on the type of message that is received. If the message 300 is a "release timeslot" message (see function 404 above), then client 104 suitably releases any timeslot 202 that was previously assigned (function 506), and returns to waiting for a startup or regular mode polling message 112 (function 504).

If the client 104 receives a startup mode polling message 112 from the host 102, then the client 104 enters a startup mode 510 to request a timeslot 202. The startup mode polling message 112 will typically define the number of TDMA timeslots that are being used in the startup mode, as well as the duration of each timeslot. The host can use this information to determine an appropriate time in which to request a timeslot that will be used in normal mode operation.

To that end, client 104 randomly selects a timeslot in which to communicate with the host 102 during startup mode. The startup timeslot may be selected using any sort of random number generation hardware or software. In various embodiments, client 104 derives a random time slot number based upon a state of a linear feedback shift register (LFSR). The LFSR may be initially seeded with a unique value associated with the client 104, such as the client's serial number, MAC address, or the like. Upon incrementing of a counter, the LFSR processes the seed value to produce a pseudo-random output. Some or all of this output (e.g., the least significant bits) can be used to generate a random number that corresponds to a random startup-mode timeslot.

Client 104 uses the randomly-selected startup mode timeslot to request a TDMA timeslot that will be used during normal mode operation. If the request is successful, the host 102 will associate a timeslot number with the requesting client and will respond with the newly-assigned timeslot number. Upon receiving an acknowledgement of an assigned timeslot, client 104 will not typically provide any subsequent communication to the host 102 during the startup mode to avoid data collisions with other clients 104.

If the client 104 does not receive an acknowledgement message from the host 102, then the client 104 will typically generate a new random number corresponding to a different time in which to place the request. New random numbers may be generated using any technique, and requests may be placed on any number of subsequent TDMA cycles until a TDMA timeslot is obtained. In various embodiments, client 104 may generate a new random number to use in a subsequent startup mode cycle by providing a new seed to an LFSR or other generator, and/or by using additional bits of the generator output.

When the host 102 determines that startup mode is complete (see functions 408 and 410 above), then it will send a normal mode polling message 112 indicating the beginning of a new TDMA cycle 200 and setting forth timing parameters for the current cycle. Client 104 receives the polling message 112 (function 508) and processes the data in the polling message 112 to determine the proper time in which to transmit any messages to host 102 (function 514). If the client 104 does not have a current message to transmit, then client 104 may simply let its timeslot pass without taking any action. It may be desirable, however, for client 104 to transmit a "keep alive" or redundant message at appropriate times to prevent host 102 from concluding that client 104 is no longer active or otherwise undesirably de-allocating the client's timeslot. Keep alive messages may not be sent in every TDMA cycle, as determined by the particular embodiment. As long as host 102 is notified from time to time that client 104 is still participating in the TDMA cycle, then host 102 will not release the timeslot associated with the otherwise-idle client 104.

If the client 104 receives a normal-mode polling message before it has established its own timeslot 202 (function 512), then the client 104 suitably attempts to obtain a timeslot 202 from host 102 during the normal operating mode (function 516). Since the polling message 112 describes the number of timeslots and the duration of the TDMA cycle 200, the client 104 can readily identify the final timeslot 203 in the cycle solely from the polling message data. If the client 104 powers up while system 100 is already in operation, for example, client 104 may be able to join the already-active system without forcing a reversion to startup mode.

To that end, system 100 may define a particular timeslot 203 (e.g., the last timeslot) of the cycle 200 for accepting timeslot requests from new devices. Each client 104 is able to identify the relevant timeslot 203 using information contained within the polling message 112. The client 104 therefore transmits a timeslot request message 300 on the channel 105 during this timeslot 203, and awaits a suitable response from the host. If the request is properly received at host 102, then the host 102 will transmit an acknowledgment to the client 104 that identifies the newly-associated timeslot for the client. Host 102 will then adapt subsequent TDMA cycles to accommodate the newly-added client 104, as appropriate.

If multiple clients 104 are attempting to request timeslots 202 at the same time, data collisions on channel 105 could prevent one or more of the requests from reaching host 102. In various embodiments, clients 104 entering system 100 do not automatically request timeslots on every timeslot 203 of every cycle 200, but rather randomly determine whether or not a request should be sent on any particular cycle. This randomness feature reduces the likelihood of a collision on timeslot 203 if multiple clients 104 are simultaneously attempting to obtain timeslots 202 from the host 102. If a client's initial request on a timeslot 203 is unsuccessful due to collision with other clients or the like, then the client may reduce the probability of re-transmitting a request on subsequent TDMA cycles. Reducing the probability of re-transmitting on any particular cycle provides more opportunity for other clients to be successful, which in turn increases the probability of success for the delaying client.

If a significant number of transmit attempts from a given client 104 are unsuccessful due to collisions or other factors, then that client 104 may request that the host 102 re-enter startup mode (i.e., request that host 102 revert back to functions 404 and 406 in FIG. 4 above). Such requests would typically be sent on timeslot 203 of the cycle 200, and may be subject to the same randomness in transmission as the timeslot requests described above (e.g., the client 104 may decide whether or not to transmit the reversion request on any particular timeslot 203 according to an appropriate probability that decreases during subsequent retries).

In various embodiments, any client 104 can transmit a request to revert to startup mode. Active clients 104 that have pre-established timeslots 202 in TDMA cycle 200 could detect collisions in time slot 203, for example. If an active client 104 detects a significant number of collisions in time slot 203, that active client 104 could assist the system 100 by transmitting a request to re-enter startup mode during that client's pre-established time slot 202.

Figure 6:
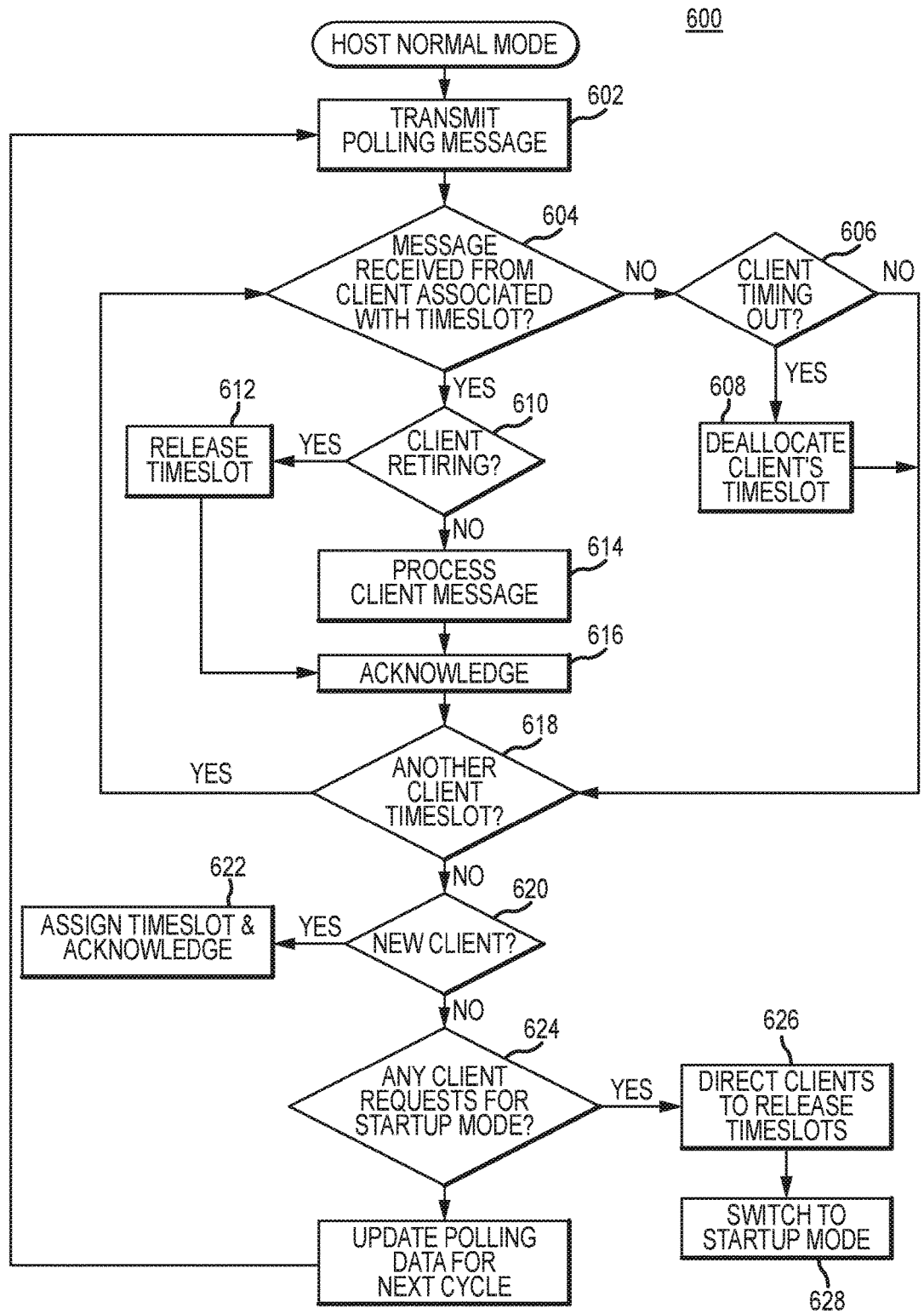
FIG. 6 is a flowchart showing an example of a process for operating a host device during a normal mode of an adaptive TDMA system.

Turning now to FIG. 6, an exemplary normal mode process 600 that is executable by the host device 102 is shown. The various functions 602-630 shown in FIG. 6 may be implemented using software or firmware executed by conventional processing circuitry in host 102, such as any sort of microprocessor, digital signal processor or the like. In various embodiments, the various functions illustrated in FIG. 6 may be carried out under the control of software or firmware logic that is stored in memory 122 and/or another non-transitory storage medium, and that is executed by processor 121 (FIG. 1).

As noted above, each TDMA cycle 200 is initiated with a polling message 112 that identifies the start of the cycle and that defines the timing parameters for that particular cycle. Host 102 broadcasts the polling message 112 on channel 105 so that each client 104 knows the number of timeslots in the cycle as well as the duration of each timeslot (function 602). This initial polling message is broadcast in the first timeslot 201 of each cycle; clients 104 do not transmit during this first timeslot 201 to avoid collisions. Note that some embodiments could use predefined values for the timeslot duration that do not change during normal operation. In such embodiments, it may not be necessary to transmit the duration value during the each polling message 112. Other embodiments could transmit duration values at regular or irregular intervals, or in response to changes in duration, or according to any other scheme.

As described above, each client 104 operating within system 100 has an assigned timeslot 202 for transmitting on channel 105. It is not necessary that the client transmit a message during every one of its assigned timeslots. If a client does not communicate for an appropriate period of time (e.g., a threshold of several seconds to several minutes, or any integer multiple of cycles 200, depending upon the particular application), then the host 102 may prompt the client 104 to send a "keepalive" or redundant message to indicate that the client 104 is still active within system 100, as described above. Such requests may be sent as part of the polling message 112, or at any other appropriate time. If no response is received from the client 104 during subsequent timeslots (function 606), then the host 102 may remove client 104 from the TDMA cycle (function 608) and the client's assigned timeslot can be released for use by other clients 104, as described herein.

If the host 102 does receive a message 300 from the client 104 that is associated with the current timeslot (function 604), then the message is processed as appropriate. Messages may instruct the host 102 to take any number of different actions. If the client 104 is shutting down or otherwise retiring from the system (function 610), for example, then the client's timeslot may be released (function 612). In various embodiments, released timeslots are identified in subsequent polling messages 112 so that clients 104 communicating on later timeslots can advance their slots and thereby make use of the available time.

Other types of messages can be processed as appropriate so that the client 104 can control the host 102, request data from host 102, or perform other functions as desired (function 614). After the message is processed, an acknowledgement 616 can be sent from the host 102 to the client 104 if appropriate for the particular message 300. As noted above, the host's acknowledgement may be transmitted during a subsequent timeslot, particularly in full duplex implementations as described above, or even after the final timeslot 203 but before the beginning of the next cycle 200 (e.g., an acknowledgement of a message sent during the final timeslot 203 may be sent after the end of the cycle 200). After the timeslot has completed, then other timeslots 202 associated with other clients 104 in system 100 can be processed in a similar manner.

After all of the timeslots associated with particular clients 104 are complete (function 618), then a final timeslot 203 can be used to receive requests for new clients (function 620) or requests to revert to startup mode (function 624). Client devices 104 are able to readily identify the final timeslot 203 from the data contained within the polling message 112, thereby allowing convenient entry into the system 100. As noted above, a client 104 that wants to enter a system 100 that is already in normal operating mode simply transmits a timeslot request during the reserved timeslot 203. When the request is received by the host 102, the host assigns the next available timeslot to the requesting client 104 and transmits an appropriate acknowledgement so that the client 104 becomes aware of its newly-assigned timeslot. The host will then adapt the number of timeslots indicated in the next polling message 112 to reflect the newly-added client 104.

As noted above, various embodiments allow clients 104 to request a reversion to startup mode if they are unable to conveniently join the system 100 (function 624). After several unsuccessful attempts to request a timeslot 202, any client 104 may detect that multiple clients 104 are attempting to use the reserved timeslot 203 at the same time, or that other issues are precluding successful registration with host 102. In such cases the client 104 could request a complete reset of all of the timeslot allocations to accommodate all of the clients 104 that are attempting to enter the system 100.

If the request is sent by a client 104 that does not yet have an assigned timeslot 202, then the request will typically be sent on timeslot 203; this could result in further bottleneck on timeslot 203, as noted above. Clients 104 may use randomness to determine whether or not to communicate on any particular timeslot 203, thereby reducing the probability of a collision and increasing the likelihood for eventual success. Moreover, some embodiments allow active clients 104 with assigned timeslots 202 to detect collisions or corruption on timeslot 203 and to use that client's previously-assigned timeslot 202 to transmit the startup mode request, as described above. In such cases, host 102 may send an acknowledgement to the active client 104 making the request, but the host 102 will not typically enter startup mode until the current TDMA cycle 200 is complete.

Upon receiving a startup request from a client 104, host 102 appropriately directs each of the clients to release their assigned timeslots (function 626) and to switch into startup mode (function 628). As noted above, clients in startup mode will typically communicate on a randomly selected timeslot during startup mode to reduce the likelihood of data collisions or other adverse effects. Many other embodiments could manage host 102 in any number of different ways.

Figure 7:
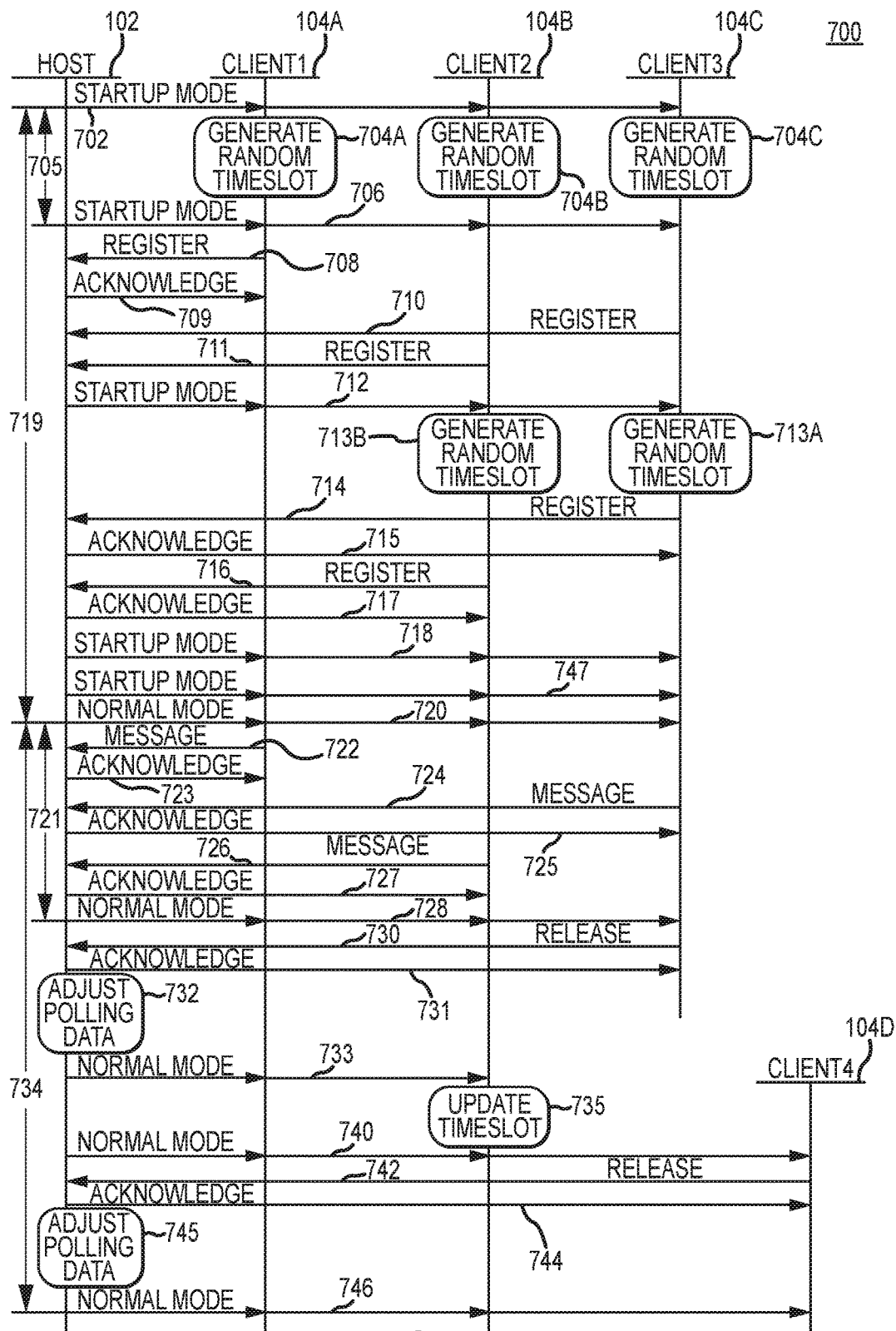
FIG. 7 is a timing diagram showing communications and functions carried out in an example of a TDMA system.

FIG. 7 shows a timing arrangement 700 for one example of a TDMA communications system 100 in which four clients 104A-D communicate with a single host 102 via communication channel 105 at various times. In the example illustrated in FIG. 7, host 102 initially operates the TDMA system 100 in a startup mode 719 in which clients 104A-C receive assigned timeslots, but later switches to a normal mode 734 after one or more timeslots are assigned.

Generally, each client 104A-C will initially generate a random timeslot number (functions 704A-C, respectively) in which to communicate in the startup mode cycle 705, as described in conjunction with FIG. 5 above. As noted above, the random timeslot number may be generated using an LFSR or other random number generator based upon a unique client identifier or other appropriate seed value. Each client 104A-C then transmits a registration request 708, 710, 714 to obtain an assigned timeslot in the normal TDMA cycle on the randomly-generated timeslot. As noted above, the timing of the requests 708, 710, 714 may be readily calculated from the information contained in the startup polling messages 702, 706, 712, 718 by multiplying the timeslot duration by the randomly generated number, and then using that product as a delay following receipt of the startup mode polling message. If the timeslot duration is specified to be 10 ms, for example, and the generated random number is "23", then the client 104 would transmit the registration request 230 ms after the beginning of the polling message.

In the example illustrated in FIG. 7, the registration request 708 sent by client 104A is received at host 102 and acknowledged with a response message 709 on the following timeslot of the startup mode cycle. This response 709 will typically include an assigned timeslot number that the client 104A can use during subsequent normal mode operation. Since client 104A now has its assigned timeslot, it will not typically participate further in startup mode operations to avoid data collisions with other clients 104B-C that may still be attempting to obtain assigned timeslots.

If the registration requests 710, 711 sent by two clients 104C, 104B (respectively) do collide or otherwise fail to be properly received by host 102, then no acknowledgement will be sent, and the unsuccessful clients 104B-C will make another attempt to register on a later startup mode cycle. In the example of FIG. 7, registration requests 710, 711 are not acknowledged, so clients 104C and 104B suitably generate new random timeslot numbers (functions 713A-B) in which to transmit new registration requests 714, 716 following a subsequent startup mode polling message 712. FIG. 7 shows that requests 714 and 716 are successfully received by host 102 and acknowledged in messages 715, 717 that provide the assigned timeslots to the requesting clients 104C, 104B as appropriate.

Host 102 may assign timeslots on any basis; in various embodiments, timeslots are assigned consecutively based upon the order of the registration requests received, and then adjusted as necessary to accommodate clients 104 entering or leaving system 100. In the example of FIG. 7, then, client 104A would typically receive the first available timeslot, with client 104C receiving the second available timeslot and client 104B receiving third available timeslot in the subsequent normal mode TDMA cycles. The first "available" timeslot may be the second (or subsequent) actual timeslot in the TDMA cycle, since the first actual timeslot may be reserved for TDMA polling messages sent from the host 102. Other embodiments could assign timeslots using other techniques, as desired.

As noted above, host 102 suitably stays in startup mode 719 until it has at least one registered client 104 and until a complete startup mode cycle 715 has completed without additional client activity on channel 105. FIG. 7 shows that clients 104A-C are registered prior to startup mode polling message 718, and that no client communication occurs in the cycle between startup messages 718 and 747. After the completion of the cycle following startup message 747, then, host 102 appropriately switches from startup mode 719 to normal operating mode 734.

Each client 104A-C calculates its appropriate timeslot by multiplying its assigned timeslot number by the timeslot duration (which may be specified in the polling message 720 in some embodiments), and then using the resulting product as a delay time following the cycle polling message 720. If each timeslot is, say, 10 ms in duration and client 104A communicates in the first available timeslot (which, in this example is the second actual timeslot in the cycle 721 since the polling message 720 occupies the first timeslot), then the client 104A would transmit any messages to the host after waiting for 10 ms after the beginning of the polling message 720 for that cycle 721. The timeslot durations could be set to accommodate any transmission delays or other inaccuracies in timing that may be inherent in system 100, as appropriate.

In the example of FIG. 7, client 104A transmits a message 722 on its timeslot that is acknowledged 723 by host 102. Clients 104C and 104B similarly transmit messages 724, 726 on their assigned timeslots, and acknowledgments 725, 727 (respectively) are sent. In a full duplex system, acknowledgements 723 and 725 may be sent at the same time as messages 724 and 726, respectively, and acknowledgement 727 would be sent on the timeslot following message 726. Single duplex implementations may further sub-divide the timeslots to provide response slots, or may handle response timing in any other manner.

Normal mode communication continues until the system is reset, or until a client 104 (or host 102) directs a reversion to startup mode 719. Requests to revert to startup mode are described above.

Each cycle 721 of normal mode 734 is dynamically adjusted to provide enough timeslots for the then-current number of clients 104A-C that are participating in the system. This adjustment takes place by changing the timing information provided in the polling messages 720, 728 that initiate each cycle. Although it is not necessary that the timing information change on every TDMA cycle, the timing information provided in each polling message 720, 728 is able to change in real time (e.g., from cycle to cycle) as needed to support then-current activity on channel 105.

In the example of FIG. 7, client 104C transmits a request 730 to release its timeslot in a cycle following polling message 728. Host 102 suitably receives the request 730, transmits an acknowledgment 731, and adapts the polling data for the following cycle accordingly (function 732). Subsequent polling messages 733 will therefore indicate that the cycle contains one less timeslot, and may also indicate the timeslot number that has been released. To continue the example above, client 104C was using the second available timeslot (corresponding to the third actual timeslot in the cycle). Upon notification in polling message 733 that client 104C's timeslot has been released, client 104B may update its assigned timeslot (function 735) to take advantage of the earlier now-available transmit time and to shorten the duration of the TDMA cycle.

Host 102 could add new clients 104D entering the system 100 using the techniques described above. If a new client 104D were to request a timeslot (or if client 104C were to re-enter the system 100), then the newly-entering client would receive a normal mode polling message 740, determine the last timeslot of the cycle from the timing information contained in the message 740, and place a request 742 on the final timeslot. Host 102 would receive request 742 and transmit an acknowledgement 744 that included the newly-assigned timeslot number that is now associated with client 104D. Host 102 would then update the polling data (function 745) to reflect the additional timeslot, and the new timing information would be transmitted on subsequent polling messages 746. Polling message 746 therefore provides the clients 104A-D with appropriate real-time information that allows each active client to have a timeslot in the cycle without assigning unnecessary timeslots to inactive clients 104C.

The foregoing discussion therefore considers various systems, devices and methods to provide adaptive, dynamic TDMA communications between a host and one or more clients. The general concepts set forth herein may be adapted to any number of equivalent embodiments. Although the discussion herein frequently considers the communications channel to be a coaxial cable used to transmit data in a DBS television system, for example, equivalent concepts could be applied to other cable-based or wireless media, or to any other applications (including telephony, sensing and control, or the like). Many other enhancements, modifications and other changes could be made in a wide array of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a host device that communicates with a plurality of clients via a communications channel, the method comprising:
    initially operating in a startup mode in which the host device transmits a startup message on the communications channel and, in response to connection requests received from at least some of the plurality of clients during the startup mode, to assign one of a plurality of timeslots in a time division multiple access (TDMA) cycle for the communications channel to each requesting client; and
    after exiting the startup mode, operating in a normal mode in which the host device initiates the TDMA cycle by transmitting a polling message on the same communications channel to indicate a start of a new TDMA cycle, wherein the polling message is transmitted in an initial timeslot of the TDMA cycle, and wherein the polling message indicates a number of timeslots occurring within the TDMA cycle; and
    changing the number of timeslots indicated in the polling message transmitted on the communications channel from TDMA cycle to TDMA cycle to thereby adapt each TDMA cycle as the number of clients communicating via the communications channel changes.

2. The method of claim 1 wherein a last timeslot of the TDMA cycle is reserved for messages transmitted on the same communications channel from clients that have not yet been assigned a timeslot in the TDMA cycle.

3. The method of claim 2 wherein the changing comprises:
    receiving, via the communications channel, a request for a new timeslot during the last timeslot of the TDMA cycle, wherein the request for the new timeslot indicates one of the plurality of clients to be added to the TDMA cycle;
    assigning a new timeslot on the same communications channel for the client to be added to the TDMA cycle;
    transmitting a response to the client to be added to the TDMA cycle, wherein the response indicates the assigned new timeslot on the communications channel; and
    adapting the number of timeslots indicated in subsequent polling messages on the communications channel to include the new timeslot for the client.

4. The method of claim 3 wherein the changing further comprises:
    receiving a release instruction from one of the clients during the TDMA timeslot that is assigned to the client; and
    in response to the release instruction, adapting the number of timeslots indicated in subsequent polling messages to reflect that the client sending the release instruction is no longer participating in the TDMA cycle.

5. The method of claim 1 wherein the changing comprises:
    receiving a release instruction from one of the clients during the TDMA timeslot that is assigned to the client; and
    in response to the release instruction, adapting the number of timeslots indicated in subsequent polling messages to reflect that the client sending the release instruction is no longer participating in the TDMA cycle.

6. The method of claim 5 wherein at least one of the subsequent polling messages indicates the assigned timeslot of the client sending the release instruction.

7. The method of claim 6 wherein each of the plurality of clients having an assigned timeslot that occurs after the timeslot of the client sending the release instruction advances its timeslot in response to the at least one of the subsequent polling messages.

8. The method of claim 1 wherein each of the plurality of clients transmits messages to the host only during its assigned timeslot.

9. The method of claim 8 wherein the communications channel supports full duplex communication, and wherein the host replies to the messages during the timeslots of the TDMA cycle immediately following the messages.

10. The method of claim 1 wherein each of the at least some of the plurality of clients transmit the connection messages on randomly-selected timeslots during the startup mode.

11. The method of claim 10 wherein each of the at least some of the plurality of clients selects one of the randomly selected timeslots using a linear feedback shift register (LFSR).

12. A host device that communicates with a plurality of clients via a communications channel, the host device comprising:
an interface to the communication channel; and
a processor configured to:
initially operate in a startup mode in which the host device transmits a startup message on the communications channel and, in response to connection requests received from at least some of the plurality of clients during the startup mode, assigns one of a plurality of timeslots in a time division multiple access (TDMA) cycle of the communications channel to each requesting client;
after exiting the startup mode, operate in a normal mode in which the host device initiates the TDMA cycle by transmitting a polling message on the same communications channel to indicate a start of a new TDMA cycle, wherein the polling message is transmitted in an initial timeslot of the TDMA cycle, and wherein the polling message indicates a number of timeslots occurring within the TDMA cycle; and
change the number of timeslots indicated in the polling message transmitted on the communications channel from TDMA cycle to TDMA cycle to thereby adapt each TDMA cycle of the communications channel as the number of clients communicating via the same communications channel changes.

13. A method executable by a client device to that communicates with a host via a communications channel, the method comprising:
obtaining an assigned one of a plurality of timeslots in a TDMA cycle of the communications channel from the host via the communications channel;
receiving a polling message indicating the beginning of the TDMA cycle from the host via the same communications channel, wherein the polling message is transmitted in an initial timeslot of the TDMA cycle, and wherein the polling message indicates timing information about the TDMA cycle including a number of timeslots occurring within the TDMA cycle, and wherein the number of timeslots indicated by the polling message dynamically varies from TDMA cycle to TDMA cycle depending upon a number of client devices communicating on the communication channel; and
transmitting a message to the host via the same communications channel during the assigned timeslot of the TDMA cycle, wherein the assigned timeslot is determined based upon the number of timeslots indicated in the polling message for the TDMA cycle.

14. The method of claim 13 wherein the obtaining comprises transmitting a timeslot request message to the host in response to a startup mode message transmitted by the host, wherein the startup mode message is separate from the polling message.

15. The method of claim 14 further comprising randomly determining a timeslot following the startup mode message to transmit the timeslot request message.

16. The method of claim 14 wherein the obtaining comprises transmitting a timeslot request in a final timeslot of the TDMA cycle, wherein the final timeslot is determined by the client device based upon the timing information indicated by the polling message from the host.

17. The method of claim 16 wherein the client device randomly determines whether or not to transmit the timeslot request during the final timeslot of the TDMA cycle based upon a probability of transmitting.

18. The method of claim 17 wherein the probability of transmitting a subsequent timeslot request decreases if the timeslot request is unsuccessful in obtaining the assigned timeslot.

\* \* \* \* \*